United States Patent [19]

Howland et al.

[11] Patent Number: 4,692,169

[45] Date of Patent: Sep. 8, 1987

[54] USE OF ETHERIFIED POLYGALACTOMANNAN GUMS AS CARBONACEOUS SLURRY STABILIZERS

[75] Inventors: Warren W. Howland, Champlin; Robert E. Arquette, Minneapolis; Shang-Ren Wu, St. Anthony, all of Minn.

[73] Assignee: Henkel Corp., Ambler, Pa.

[21] Appl. No.: 795,521

[22] Filed: Nov. 12, 1985

Related U.S. Application Data

[63] Continuation-in-part of Ser. No. 686,787, Dec. 27, 1984.

[51] Int. Cl.$^4$ .................................................. C10L 1/32
[52] U.S. Cl. ........................................... 44/51; 44/77; 252/351; 406/197
[58] Field of Search .................... 44/51, 77; 252/351; 406/197

[56] References Cited

U.S. PATENT DOCUMENTS

| | | | |
|---|---|---|---|
| 3,728,173 | 4/1973 | Cook et al. | 149/21 |
| 3,748,201 | 7/1973 | Jordan | 149/109 |
| 4,242,098 | 12/1980 | Braun | 44/51 |
| 4,304,906 | 12/1981 | Kang et al. | 536/114 |
| 4,375,358 | 3/1983 | Swartz et al. | 44/51 |
| 4,415,338 | 11/1983 | Schick et al. | 44/51 |
| 4,436,528 | 3/1984 | Schick et al. | 44/51 |
| 4,441,889 | 4/1984 | Mark | 44/51 |
| 4,511,364 | 4/1985 | Mitsumori | 44/51 |

*Primary Examiner*—William R Dixon, Jr.
*Assistant Examiner*—Margaret B. Medley
*Attorney, Agent, or Firm*—Ernest G. Szoke; Patrick J. Span

[57] ABSTRACT

Carbonaceous slurries are provided in which the carbonaceous slurry stabilizer is selected from the group of
(1) the alkyl ether of a polygalactomannan alone, or in combination with xanthan gum or
(2) the hydroxyalkyl ether of a polygalactomannan in combination with xanthan gum, or
(3) a mixture of said alkyl ether, said hydroxyalkyl ether and said xanthan gum.

30 Claims, No Drawings

USE OF ETHERIFIED POLYGALACTOMANNAN GUMS AS CARBONACEOUS SLURRY STABILIZERS

This application is a continuation-in-part application of U.S. patent application Serial No. 686,787, filed Dec. 27, 1984.

BACKGROUND OF THE INVENTION

1. Field of the Invention

This invention relates to the use of etherified polygalactomannan gums as carbonaceous slurry stabilizers. More particularly, this invention relates to the use of (1) the alkyl ether of a polygalactomamman alone, or in combination with xanthan gum or (2) the hydroxyalkyl ether of a polygalactomannan in combination with xanthan gum to stabilize a carbonaceous slurry.

2. Statement of the Related Art

U.S. Pat. No. 4,242,098 discloses the use of certain water soluble polymers, e.g. xanthan gum, hydroxypropyl guar or carboxymethyl hydroxypropyl guar gum, in an aqueous coal slurry to permit the extrusion, pumping and transport of higher solids content aqueous coal slurries.

A similar teaching is found in U.S. Pat. No. 4,375,358 which discloses the use of xanthan gum as a gelling agent in combination with certain cellulose or starch derivatives. U.S. Pat. No. 4,436,528 discloses slurries using alginates or polygalactomannan gums or their derivatives, i.e. guar and locust bean gums and derivatives such as those disclosed in U.S. Pat. No. 4,242,098 referred to earlier.

U.S. Pat. No. 4,441,889 discloses examples of stable coal-aqueous mixtures containing both xanthan gum and guar gum along with a nonionic surfactant. The examples contain two different ratios of xanthan gum to guar gum: 2 parts xanthan to 1 part guar and 10 parts guar to 1.4 parts xanthan.

U.S. Pat. No. 3,748,201 discloses the use of blends of xanthan gum and hydroxyalkyl ethers of guar gum to thicken printing pastes, explosive slurries and drilling muds. Similarly U.S. Pat. No. 3,728,173 discloses a slurry explosive containing a mixture of guar gum and xanthan gum.

WIPO publication number WO83/04047 discloses that a stable aqueous coal slurry can be prepared by the addition of a surface active agent having a hydrophilic chain composed of between about 40 to about 200 ethylene oxide units. The publication states that a slurry having a yield-pseudoplastic character is undesirable for pipeline transport. Thickeners such as xanthan gum are known to produce aqueous solutions having the yield-pseudoplastic character.

Ideally, a slurry containing carbonaceous material and a liquid should be stable under the dynamic conditions it might encounter during pumping and shipping and under the static conditions of bulk storage. In the transportation of such a slurry, (such as by barge, marine tanker, rail car, or truck tank car) various stresses might be encountered. The vibrations to which the slurry will be subjected will vary in both amplitude and frequency. Thus, for example, during shipboard travel where there is relatively little clearance between the hull and the harbor or river bottom, severe shaking of the ship will be caused by pressure waves from the ship's propellers. When shipboard travel occurs on the open water, by comparison, there will be more roll, and some pitch, but the amount of high frequency vibration should be relatively small. The amount of motion a slurry is subjected to during any type of travel should vary with the extent of confinement of the slurry: full tanks would slosh very little, and partially empty tanks would slosh considerably more.

One problem encountered with many prior art coal-water slurries is that they become unmixed when they are subjected to vibration, with disastrous consequences. When such a slurry is being pumped, the solid particles settle out of the slurry to the bottom of the pipe, thereby changing the solids content and other properties of the slurry; often a hard pack of solid material is formed which is difficult or impossible to readily resuspend in the slurry.

It is probable that, to some extent, some settling will occur in coal-liquid slurries subjected to vibratory conditions. It is desirable to minimize the degree of settling. It is also desirable to provide a slurry wherein, even if settling does occur, the settled particles form a "soft pack" (as opposed to a hard pack) and can be easily resuspended in the slurry.

The coal-water mixtures are employed as fuels in that they may be atomized into small droplets and high surface area per volume ratios which provide for efficient conversion and stable ignition.

SUMMARY OF THE INVENTION

This invention relates to carbonaceous slurry compositions containing as a stabilizer an etherified galactomannan gum, wherein the stabilizer is (a) an alkyl ether of a polygalactomannan gum, alone or in combination with xanthan gum or (b) an hydroxyalkyl ether of a polygalactomannan gum in combination with xanthan gum. Where mixtures with xanthan gums are employed, the preferred weight ratios of xanthan gum to the polygalactomannan gum ether in the carbonaceous slurry range from about 20:80 to about 80:20, respectively. The ratio more preferably ranges from about 40:60 to about 60:40 xanthan gum to galactomannan alkyl ether.

This invention also provides a method of transporting a carbonaceous solid comprising pumping the carbonaceous slurry containing an alkyl ether of a polygalactomannan gum, alone or xanthan gum in admixture with the alkyl or hydroxyalkyl ether to a carbonaceous slurry. This invention further provides a method of stabilizing carbonaceous slurries and a carbonaceous slurry stabilizer composition containing the alkyl ether alone or a mixture of xanthan gum with the alkyl or hydroxyalkyl ether of the polygalactomannan gum.

DETAILED DESCRIPTION OF THE INVENTION

The carbonaceous slurries of the instant invention are mixtures of a carbonaceous solid and a liquid stabilized with (a) an alkyl ether of a polygalactomannan gum, alone, or mixed with a xanthan gum or (b) an hydroxyalkyl ether of a polygalactomannan gum in combination with xanthan gum or (c) a mixture of said alkyl ether, said hydroxyalkyl ether and xanthan gum. As used herein, the term carbonaceous solid is intended to be generic to carbonaceous solids such as coal, coke, graphite and the like. Specific examples of preferred coals include low volatile bituminous coals from West Virginia, high volatile bituminous coals from Kentucky, Ohio or Arizona and sub-bituminous coals from Montana may be used in the practice of this invention. Anthracite, semi-anthracite, medium and high volatile bituminous, and lignite coals may also be used in this invention.

The coal for use in this invention can be obtained in a dry or wet form and mixed with liquid to form a coal-liquid slurry. Preferably, the coal for making a fine particle sized fraction is wet milled in known ways to prevent dust and explosion hazards. The wet milled coal fraction can be milled with all the water, or it can be mixed with sufficient additional water to make a slurry which will be readily pumpable in a pipeline when it further is mixed with a coarser pulverized coal fraction to form a coal-water slurry.

In one preferred embodiment, the coal utilized in the coal-liquid slurry of this invention is "pulverized".

The term "pulverized coal" (or "P.C."), as used in this specification, refers to coal which has been milled or ground to a consist of about 40 mesh X O: see the Handbook of Chemistry and Physics, 51st Edition (CRC Publishing Co., Cleveland, Ohio, 1970–1971), page F-199, the disclosure of which is hereby incorporated herein by reference.

In view of the manner in which coal fractures during milling, coal particles will have irregular shapes which, however, are of a body (or maximum side-to-side thickness) such that the sub-sieve sized discrete particles will pass through a specified mesh of a sieve. The size of the discrete particle can be expressed in terms of a spherical diameter which, as used herein, is defined as a U.S. sieve size of from 16 mesh (1.18 mm) to 400 mesh (0.038 mm) or its equivalent in microns through which a coal particle from a sample or coal or coal-water slurry will pass. For particles finer than 200 mesh, the size of the particles can be expressed in mm as determined by means of a sieve, or a sedimentometer, or a scanning electron microscope (SEM). In a preferred embodiment, from about 85% to about 90% of the particles are less than 200 mesh.

Mixtures of carbonaceous solids also can be used in the slurry of this invention. By way of illustration and not limitation, one can use a mixture of a coarse carbonaceous fraction which contains less than about 30 weight percent of volatilizable hydrocarbons (such as, e.g., anthracite or low volatile bituminous coal) and a fine carbonaceous fraction which contains more than about 35 weight percent of volatilizable hydrocarbons (such as, e.g., lignite or high volatile bituminous coal). One can use a mixture of two or more of said coarse carbonaceous fractions and one of said fine fractions, one of said coarse carbonaceous fractions and two or more of said fine fractions, or two or more of said coarse carbonaceous fractions and two or more of said fine fractions.

The slurry of this invention is comprised of one or more liquids. As used in this specification, the term liquid refers to water, water miscible alcohols, and mixtures thereof. The liquid used in the slurry of this invention preferably performs at least two functions—it fills the interstitial pores of the carbonaceous solid material, and it provides the vehicle for separation of the particles of the carbonaceous solid material to minimize collisions between said particles; thus, the preferred liquid is a carrier liquid.

In one preferred embodiment, the liquid used in the slurry of this invention is carrier water. As used in this specification, the term "carrier water" means the bulk of free water dispersed between the coal particles and contiguous to the bound layers of the particles, and it is to be distinguished from bound water. The term "bound water" means water retained in the "bound water layer," as defined and illustrated in Kirk-Othmer, Encyclopedia of Chemical Technology, 2nd Edition, Vol. 22, pages 90–97 (at p. 91).

The kind of water used as carrier water in the coal-water slurry of this invention may be any available water, such as mine, well, river, or lake water or desalinated ocean water having a sufficiently low mineral salt content such that the electrochemistry of the bound water layer and carrier water interface can be controlled, in accordance with the invention and corrosion of milling facilities, pipe lines and furnaces will be minimized and controllable.

When water is added to a carbonaceous powder comprised of finely divided particles, and if the water "wets" the powder, a surface water film is adsorbed on each particle which is known to be structurally different from the surrounding "free" or bulk water, in that the film may be described as "semi-rigid", or "bound water film". Depending on the fundamental electrical potential of the surface, this "semi-rigid" or bound water film may be of several molecules thickness.

In another embodiment, an alcohol is the liquid used in the slurry of this invention. The preferred alcohols are completely or partially water miscible, e.g. methanol, ethanol, n-propanol, isopropanol, t-butanol, glycerol, etc.

Mixtures of two or more liquids can be used in the slurry of this invention. Thus, by way of illustration and not limitation, one may use mixtures of water and an alcohol, e.g. methanol. One can use mixtures comprised of from about 1 to about 99 volume percent of alcohol and from about 99 to about 1 volume percent of water. In one preferred embodiment, the mixture is comprised of from about 1 to about 15 volume percent of alcohol with the remainder of the liquid consisting essentially of water. It is preferred that the alcohol be liquid and water miscible and that it contain from about 1 to about 10 carbon atoms, e.g. methanol, ethanol, isopropanol, t-butanol, glycerol, etc.

High solids content aqueous coal slurries and, in particular, the transport thereof by pipeline are well known. A high solids content aqueous carbonaceous slurry is generally defined as containing from about 50% to about 80% by weight of particulate carbonaceous solid based on the weight of the carbonaceous slurry. The carbonaceous slurries of this invention may contain from about 50% to about 80% by weight particulate coal, but preferably contain from about 65% to about 70% by weight particulate coal.

When an alkyl etherified polygalactomannan gum is employed in the stabilizer compositions of this invention it may be employed alone, or a xanthan gum may be employed in admixture with the alkyl ether. Where hydroxyalkyl alkyl ethers are employed they are employed only in admixture with the xanthan gum. Where xanthan gum is used mixtures of the alkyl and hydroxyalkyl ethers may be employed. The alkyl etherified polygalactomannan gums useful in the practice of this invention are polygalactomannan polysaccharides that have been etherified by the reaction of the free hydroxyl groups of the polygalactomannans with etherifying agents such as as the alkyl halide or dialkyl sulfates, preferably the alkyl halides.

Whenever the following description refers specifically to guar gum, it is understood that the disclosure is applicable to other closely related polygalactomannan gums in general, and locust bean gum in particular. The term "alkyl halide" is meant to include alkenyl and aralkyl halides such as allyl halide and benzyl halide. The preferred alkyl halides are alkyl chlorides and alkyl bromides containing between one and about twenty, preferably one to four, carbon atoms, e.g., methyl chloride, iodide and bromide, pentyl chloride and bromide, decyl chloride and bromide, eicosyl chloride and bromide, and the like.

By the term "degree of substitution" as employed herein is meant the average substitution of ether groups per anhydro sugar unit in the polygalactomannan gums. In guar gum, the basic unit of the polymer consists of two mannose units with a glycodisic linkage and a galactose unit attached to a hydroxyl group of one of the mannose units. On the average, each of the anhydro sugar units contains three available hydroxyl sites. A degree of substitution of three would mean that all of the available hydroxy sites have been substituted with alkyl ether groups.

The preferred ethers are the polygalactomannan methyl ethers which are produced by contacting the gum with a methylating reagent in the presence of a basic compound. The preparation of such methyl ethers can be seen from U.S. Pat. No. 4,169,798.

As disclosed in U.S. Pat. No. 4,169,789, the basic compounds preferred are the strong bases such as the alkali metal hydroxides. Illustrative of basic compounds are sodium hydroxide, potassium hydroxide, calcium hydroxide, barium hydroxide, sodium carbonate, potassium acetate, sodium methoxide, tetramethylammonium hydroxide, and the like. In general the hydroxide component will be employed in an amount of from 1-3 moles of hydroxide per mole of alkyl halide present in the reaction system.

The quantity of alkyl halide employed is determined by the degree of substitution which is desirable to achieve. A higher relative weight ratio of alkyl halide reactant to galactomannan gum yields a higher degree of substitution is in the range between about 0.05 and 2.5, with the lower limits being the most preferred for purposes of this invention, i.e. a D.S. of about 0.1 to about 0.4.

As described in U.S. Pat. No. 4,169,945, a water soluble or miscible quaternary ammonium compound is generally employed as a phase transfer catalyst to provide process efficiency. When emplyed the quaternary compound is employed in an amount of about 0.05-5, and preferably about 0.103, weight percent based on the weight of polygalactomannan gum.

The solid guar of other polygalactomannan which is etherified can be in the form of endosperm splits or in the form of finely divided powder which is derived from the endosperm splits. The polygalactomannan gum being etherified with alkyl groups remains as a solid phase in the reaction medium during the reaction period.

The etherification process is conveniently conducted as a two-phase reaction system comprising an aqueous solution, or an aqueous solution of a water-miscible solvent, in contact with solid polygalactomannan gum. In the case of the water-miscible solvent medium, the water content of the medium preferably is maintained in the range between about 10 and 60 weight percent, depending on the particular solvent of choice. If more than an optimum quantity of water is present in this type reaction medium, then the polygalactomannan gum may swell or enter into solution, thereby complicating product recovery and purification.

Suitable water-miscible solvents for suspension or polygalactomannan gum in the reaction medium include alkanols, glycols, cyclic and acyclic alkyl ethers, alkanones, dialkylformamide, and the like, and mixtures thereof. Illustrative of suitable water-miscible solvents are methanol, ethanol, isopropanol, secondary butanol, secondary pentanol, ethyleneglycol, acetone, methylethylketone, diethylketone, tetrahydrofuran, dioxane and dimethylformamide.

As described in the previously noted U.S. Pat. Nos. 4,169,748 and 4,169,945, the process for alkyl etherification of polygalactomannan gum is conducted at a temperature in the range between about 0° C. (more desirably above 10° C.) and 100° C. and most preferably in the range between about 20° C. and 60° C. For convenience, the process can be conducted at ambient temperature. At the lower temperatures the reaction rate is slower, and at the higher temperature the reaction is faster but the formation of by-products is increased. The reaction time can be varied in the range between about 1 and 12 hours.

In use as a stabilizer for carbonaceous slurries of this invention the stabilizer, whether the alkyl ether of the polygalactomannan gum alone or when xanthan is employed in admixture with the etherified gum, is employed in an amount up to 2%, more desirably less than 1% and preferably from 0.02 to about 0.2% based on the weight of the coal-water mixture (CWM). Mixtures of the xanthan gum with etherified gum are generally added to the carbonaceous slurry as a blend, however, the sequential addition of both polymers are within the contemplation of the present invention.

The carbonaceous slurries of this invention also preferably contain a nonionic surfactant. In general, the use of such surface active agents will minimize the interaction between the surface of the carbonaceous solid and the polysaccharide polymers used as stabilizers. The minimization of this interaction prevents excessive flocculation which tends to destabilize the carbonaceous slurry.

The term nonionic surfactant as used herein means any long chain organic compound, or mixture thereof, having distinct hydrophilic and hydrophobic portions. The surfactant, when added to aqueous solutions at a level of about 0.1% by weight or higher, yield aqueous solutions having a surface tension below 50 dynes/cm. Examples of suitable nonionic surfactants include long chain fatty alcohols, ethylene oxide adducts of long chain fatty alcohols, ethylene oxide adducts of alkylated phenols, and block copolymers of ethylene oxide with a higher alkylene oxide such as propylene oxide. Specific examples include the ethylene oxide adducts of nonylphenol sold by GAF under the trade name, IGEPAL ® and the block co-polymers of ethylene oxide and propylene oxide sold by BASF under the tradename Pluronic.

When preparing the coal slurries of the present invention, it is preferred that the nonionic surfactant be added to the carbonaceous slurry prior to the addition of the thickener to prevent any interaction between the surface of the carbonaceous solid and polysaccharide polymers used as stabilizers, which may occur.

As indicated earlier, the alkyl gum ether may be employed alone as the stabilizer or it may be employed in admixture with a xanthan gum. When xanthan gum is employed in admixture with the alkyl guar, (methyl guar) it can replace up to about 80% of the methyl guar (MG) or up to a ratio of 80:20 by weight of the stabilizer mixture. When the hydroxyalkyl etherified gum is employed, it is always employed in admixture with the xanthan gum. Where mixtures are employed the xanthan gum is used in a ratio of 20:80 to 80:20 by weight with 40:60 to 60:40 having the advantageous properties.

Xanthan gums are produced commercially by several manufactures and are readily available. Xanthan gum is a high molecular weight natural polysaccharide product in a fermentation. Xanthan gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotae, Xanthomonas translucens, Xanthomonas herderae* and *Xanthomonas papvericoli.* The gum produced by the bacteria *Xanthomonas campestria* is preferred for the purpose of this invention. The fermentation usually involves inoculating a fermentable broth containing a carbohydrate, various mineral and a nitrogen yielding compound. A number of modifications in the fermentation procedure and subsequent processing are commercially used. Due to the variety of fermentation techniques and differences in processing operation subsequent to fermentation, different production lots of xanthan gum will have somewhat different solubility and viscosity properties. U.S. Pat. No. 3,748,201 describes one such preparation, the disclosure of which is incorporated herein by reference.

The hydroxyalkyl ethers employed in admixture with xanthan gums are well known and readily available commercially from several manufacturers. The preparation of the hydroxyalkyl ethers of guar gum is described in U.S. Pat. No. 3,748,201 earlier noted, the disclosure of which is incorporated herein by reference. Briefly as described the hydroxyalkyl ether of the polygalactomannan are made by reacting guar gum with alkylene oxide in the presence of an alkaline catalyst. The alkylene oxide forms an ether linkage with a hydroxyl group of the guar gum. As noted earlier in guar gum each saccharide ring has an average of three hydroxyl groups with which the alkylene oxide can react. In the case of the hydroxyl alkyl ethers, as a now hydroxyl group is generated from the reaction with the alkylene oxide, repeating units of the alkylene oxide may be reacted with generated hydroxyl group so that a molar substitution of alkylene oxide greater than three can be achieved.

The preferred hydroxyalkyl etherified gums are hydroxyalkyl guar gums, e.g. hydroxypropyl guar gum and hydroxyethyl guar gums which are generally prepared by the base catalyzed reaction of the guar gum with an alkylene oxide, preferably having 2-4 carbon atoms, e.g. propylene oxide, butylene oxide or ethylene oxide.

In order for the reaction between the guar gum and the alkylene oxide to proceed, the presence of an alkaline catalyst is necessary. Such catalysts are in general the alkali metal or alkaline earth metal hydroxides earlier noted in regard to the preparation of the methyl guar. Very small amounts of catalyst may be employed, as low as 0.05 percent based on the weight of the guar gum. It is generally not necessary to exceed 10 percent by weight of the guar gum, although larger amounts might be used. In general, about 2 percent to 3 percent catalyst by weight of the guar gum is employed.

The reaction can be conducted at room temperature or elevated temperatures. The temperature range in which the reaction is generally conducted is about 17° C. to about 100° C. While higher temperatures can be used, such as up to 125° C., there is generally no advantage achieved. The reaction can be conducted at atmospheric temperature, under reflux, or at elevated pressures in a closed reactor. The exact pressure is not critical and while higher pressure maybe employed, operation is normally conducted at whatever pressure develops during the reaction. Generally such autogenous pressures will be on the order of from about 30 to 125 p.s.i.g.

The reaction may be conducted in the substantial absence of water or solvent (no water added). Organic solvents either water-miscible or water-immiscible organic solvents can be employed. Illustrative of such organic solvents are isopropanol (water-miscible) and heptane (water-immiscible).

The examples to follow will serve to illustrate the foregoing in which examples all parts and percentages are by weight, unless otherwise indicated.

EXAMPLES

EXAMPLES 1-8

In each example, the same relative amounts of particulate coal, water, defoamer, surfactant and total polymer were used. Only the ratio or relative amounts of each component polymer were varied. Each mixture was prepared in accordance with the following procedure. The surfactant was thoroughly dissolved in the water and the solution transferred to a rod mill. To this solution the defoamer and particulate coal were added. The mill was sealed and rotated for 2 hours to effect complete dispersion of the coal. To aliquots of the coal-aqueous mixture so prepared were added the polymer admixtures (i.e. xanthan and hydroxypropyl guar) as a powder using paddle stirrers at 4–800 rpm. The particular identity of the coal slurry components and the amounts thereof are described in Table I. Stirring was continued for 30 minutes. After static aging for 16–24 hours the mixtures were stirred again for 30 minutes using the paddle stirrer. Rheological peoperties of the slurries were then determined for each sample using a Fann 39B rheometer for the high shear ($100s^{-1}$) rheology and a Brookfield model RVT (4 spindle) for the low shear ($0.10\ s^{-1}$ and $1.02\ s^{-1}$) rheology. The bulk viscosity of each slurry at these shear rates is reported in Table II.

The samples were then allowed to age statically at 25° C. for 4 weeks. The stability of the slurries, with respect to particle settling and bed compaction when then evaluated by two different methods. At one week intervals following the preparation of the slurries, viscosity profiles of each slurry, i.e. viscosity as a function of container depth, were measured with a Brookfield viscometer and Helipath attachment. After 4 weeks of testing, these viscosity profiles indicated an increase in bulk slurry viscosity of all samples over time, but no substantial increase in viscosity as a function of container depth for any of the samples, i.e. very little sedimentation of the slurries.

The resistance of each slurry to penetration by a ¼ in. glass rod having 77 g of added weight was then evaluated. A ¼ in. glass rod having 77 g added weight was placed vertically in a guide at the surface of the slurry and was then allowed to penetrate the slurry. The resistance to penetration is reported in Table III as % penetration, i.e. 100% indicating that the rod penetrated to the bottom of the container and 0% indicating that the rod failed to penetrate the surface of the slurry.

The particular identity of the coal slurry components and the amounts thereof are described in Table I.

TABLE I

COAL-WATER MIXTURE COMPOSITION AND RHEOLOGY

| Examples | 1 | 2 | 3 | 4 | 5 | 6 | 7 | 8 |
|---|---|---|---|---|---|---|---|---|
| Components (wt %) | | | | | | | | |
| Particulate coal[1] | 65 | 65 | 65 | 65 | 65 | 65 | 65 | 65 |
| Water[2] | 33.80 | 33.80 | 33.80 | 33.80 | 33.80 | 33.80 | 33.80 | 33.80 |
| Surfactant[3] | 0.60 | 0.60 | 0.60 | 0.60 | 0.60 | 0.60 | 0.60 | 0.60 |
| Defoaming Agent[4] | 0.35 | 0.35 | 0.35 | 0.35 | 0.35 | 0.35 | 0.35 | 0.35 |
| Xanthan Gum[5] | 0.10 | 0.09 | 0.08 | 0.07 | 0.06 | 0.05 | 0.04 | 0.00 |
| Hydroxypropyl Guar Gum[6] | 0.00 | 0.01 | 0.02 | 0.03 | 0.04 | 0.05 | 0.06 | 0.10 |
| Formaldehyde 37%[7] | 0.15 | 0.15 | 0.15 | 0.15 | 0.15 | 0.15 | 0.15 | 0.15 |

[1]Lower Cedar Grove seam coal ground to 90% minus 200 mesh Tyler Standard screen size.
[2]Deionized water.
[3]Igepal ® CO-990, GAF Corp., NY, NY.
[4]Colloid ® 691, Colloids Inc., Newark, NJ.
[5]Kelzan S, ® Kelco Inc., San Diego, CA.
[6]GALACTASOL ® 416, Henkel Corp., Minneapolis, MN.
[7]37% Formaldehyde, Fischer Scientific.

TABLE II

SLURRY RHEOLOGY

| | Viscosity (cps) at Shear Rate of: | | |
|---|---|---|---|
| Example | $0.10(s^{-1})$ | $1.02(s^{-1})$ | $100(s^{-1})$ |
| 1 | 75,200 | 26,000 | 2,381 |
| 2 | 64,400 | 25,320 | 2,400 |
| 3 | 70,400 | 25,600 | 2,095 |
| 4 | 62,000 | 25,680 | 2,071 |
| 5 | 62,000 | 24,800 | 1,943 |
| 6 | 66,800 | 24,360 | 2,095 |
| 7 | 67,200 | 25,560 | 1,928 |
| 8 | 84,400 | 32,560 | 2,114 |

TABLE III

SLURRY STABILITY

| Example | Xanthan/HPG (wt %/wt %) | Rod Penetration at 4 weeks (%) |
|---|---|---|
| 1 | 100/0 | 16.5 |
| 2 | 90/10 | 27.8 |
| 3 | 80/20 | 75.9 |
| 4 | 70/30 | 22.8 |
| 5 | 60/40 | 53.2 |
| 6 | 50/50 | 100 |
| 7 | 40/60 | 59.5 |
| 8 | 0/100 | 34.2 |

The data in Table II shows that samples containing mixtures of xanthan and hydroxypropyl guar generally with the exception of the high shear rheology of Example 2, exhibit a bulk viscosity lower than that of samples having only xanthan or hydroxypropyl guar. This result is surprising in view of the synergism that is normally expected from xanthan and hydroxypropyl guar. The data in Table III shows that the use of a 50/50 blend of xanthan and hydroxypropyl guar yields a slurry having superior stability in terms of rod penetration of the slurry.

EXAMPLE 9

A base, unstabilized coal-water mixture having good fluidity is prepared by dispersing pulverized coal (PC) in an aqueous surfactant solution to which has also been added a hydrocarbon based defoamer. The mixing apparatus consists of a cylindrical vessel into which 4 baffles have been positioned 90° apart. A 4-bladed paddle agitator is centered in the vessel. The baffle and turbine geometries are sized relative to the dimensions of the cylindrical vessel in accordance with standard chemical engineering practices as is discussed in Transport Processes and Unit Operations, C. J. Geankoplis, Allyn & Bacon, Boston (1978).

The paddle is rotated at 1000 RPM and the pulverized coal is slowly sifted into the aqueous surfactant solution. After all the coal has been delivered agitation is continued for an additional 30 minutes. Formaldehyde is added to preserve all formulations against biological growth which may degrade the chemicals present. The base, unstabilized coal-water mixture from which all formulation were prepared had the composition of the following Table IV.

TABLE IV

| Component | Concentration based on Total Mixture Wt. |
|---|---|
| 1. Splash Dam pulverized Coal (a) 80–85% −200 Tyler Screen Size | 70.0% |
| 2. Igepal ® CO-990 Ethoxylated (b) Nonylphenol Surfactant | 0.50% |
| 3. Colloids ® 691 Defoamer (c) | 0.05% |
| 4. Formaldehyde (d) | 0.135% |
| 5. Water (e) | 29.315% |

(a) Splash Dam coal is a product of the United Coal Company, Bristol VA.
(b) Igepal ® CO-990 surfactant, GAF Corporation, NY, NY.
(c) Colloids ® 691 hydrocarbon-based defoamer, Colloids Inc, Newark NJ.
(d) 37% formaldehyde, Fischer Scientific.
(e) Distilled Water To aliquots of this mixture were added the polymeric stabilizers in the amounts indicated in Table IV. The polymer was added as a dry powder directly to the coal-water mixture under moderate agitation. Agitation is continued for a total of 30 minutes in order to effect complete dissolution and uniform distribution of the polymer. The formulations are allowed to stand overnight, remixed for 15 minutes, and then a viscosity measurement is made at 25.0° C. A Haake "Rotovisco" 12 with an MV-II rotor system is used to evaluate the stabilized mixture rheology.

After the viscosity is measured 220 g of each formulation are delivered to 8 oz glass jars the inside bottoms of which have been made level by covering the surface with a hard resin. The formulations are stored undisturbed at ambient temperatures for 10 weeks. The amount of sediment accumlating with time is determined by lowering a small, ¼" width, stainless steel laboratory spatula into the slurry with very little force applied by hand in addition to that exerted by gravity. The depth at which a significant increase in resistance to penetration is detected is recorded. The percent sediment is calculated as follows:

$$\frac{\text{(Total Sample Height)} - \text{(Depth of Spatula Penetration)} \times 100}{\text{(Total Sample Height)}}$$

The bulk mixture apparent viscosity at $57.6\ s^{-1}$ shear rate and the percent sediment after 4, 8 and 10 weeks static aging is shown in Table V. Polymer concentration is on parts-per-hundred coal-water mixture basis; admixture ratios are on a weight basis. Where admixtures were formulated the polymer concentration refers to the total content.

In the Table the following abbreviations are employed for the composition:

| Guar (a) | G |
|---|---|
| Hydroxypropyl guar | |
| D.S. = 0.1 (b) | HPG-1 |
| D.S. = 0.22 | HPG-2 |
| D.S. = 0.4 | HPG-4 |
| Methyl Guar | |
| D.S. = 0.13 | MG-1 |
| D.S. = 0.31 | MG-3 |
| Xanthan Biopolymer (c) | X |

(a) GALACTOSOL 211X ® guar gum - Henkel Corporation
(b) GALACTOSOL 416 ® hydroxypropyl guar - Henkel Corporation
(c) KELZAN S ® xanthan biopolymer - Kelco Co.

TABLE V

APPARENT VISCOSITY AT 57.6 S$^{-1}$ AND PERCENT ACCUMULATED SEDIMENT AFTER 4, 8 AND 10 WEEKS STATIC, AMBIENT STORAGE FOR STABILIZED COAL-WATER MIXTURES

| POLYMER COMPOSITION | | APPARENT VISCOSITY mPa S POLYMER CONCENTRATION % | | 4 WEEKS POLYMER CONCENTRATION - % | | % SEDIMENT 8 WEEKS POLYMER CONCENTRATION - % | | 10 WEEKS POLYMER CONCENTRATION - 5 | |
|---|---|---|---|---|---|---|---|---|---|
| | | 0.060 | 0.075 | 0.060 | 0.075 | 0.060 | 0.075 | 0.060 | 0.075 |
| Base Mixture | | 221 | | 78 | | 78 | | | |
| G | | 1040 | 1370 | 29.3 | 2.4 | 57.3 | 30.1 | 75.6 | 80.8 |
| HPG-1 | | 1580 | 1950 | 7.5 | 3.7 | 26.3 | 13.6 | 37.3 | 16.0 |
| HPG-2 | | 1630 | 1930 | 3.6 | 0 | 32.5 | 24.4 | 51.8 | 37.8 |
| HPG-4 | | 1310 | 1490 | 13.4 | 0 | 61.0 | 12.2 | 72.0 | 32.9 |
| MG-1 | | 1440 | 1770 | 9.9 | 2.5 | 23.4 | 13.8 | 30.9 | 17.5 |
| MG-3 | | 1490 | 1620 | 9.8 | 0 | 23.2 | 13.6 | 30.5 | 29.6 |
| X | | 1240 | 1460 | 0 | 0 | 0 | 0 | 17.1 | 0 |
| Admixtures - wt/wt | | 0.060 | 0.075 | 0.060 | 0.075 | 0.060 | 0.075 | 0.060 | 0.075 |
| X/G | 50/50 | 1250 | 1640 | 1.2 | 0 | 13.6 | 0 | 17.3 | 4.9 |
| X/G | 60/40 | 1300 | 1740 | 2.5 | 0 | 10.0 | 4.9 | 16.3 | 7.4 |
| X/HPG-1 | 50/50 | 1730 | 1970 | 2.5 | 0 | 13.6 | 0 | 14.8 | 11.1 |
| X/HPG-1 | 60/40 | 1580 | 1950 | 1.2 | 0 | 14.6 | 0 | 24.4 | 7.5 |
| X/HPG-2 | 50/50 | 1450 | 1870 | 10 | 0 | 8.5 | 0 | 20.7 | 0 |
| X/HPG-2 | 60/40 | 1550 | 1820 | 0 | 0 | 9.8 | 0 | 19.5 | 0 |
| X/HPG-4 | 50/50 | 1400 | 1850 | 0 | 0 | 14.6 | 0 | 35.4 | 0 |
| X/HPG-4 | 60/40 | 1380 | 1560 | 0 | 0 | 12.3 | 0 | 17.3 | 7.6 |
| X/MG-1 | 40/60 | 690 | 880 | 0 | 0 | 0 | 0 | 6.8 | 0 |
| X/MG-1 | 50/50 | 1400 | 1790 | 0 | 0 | 12.3 | 0 | 16.0 | 9.9 |
| X/MG-1 | 60/40 | 1500 | 1590 | 1.2 | 0 | 14.8 | 4.9 | 25.9 | 13.6 |
| X/MG-3 | 40/60 | 1660 | — | 1.2 | 0 | 14.8 | 2.5 | 24.7 | 8.6 |
| X/MG-3 | 50/50 | 1520 | 1800 | 0 | 0 | 12.5 | 7.4 | 21.3 | 14.8 |
| X/MG-3 | 60/40 | 420 | 450 | 2.4 | 0 | 13.4 | 6.2 | 22.0 | 13.6 |

From the foregoing Table V data it can be seen that:
1. As the proportion of methyl guar is increased in the admixture its effectiveness as a stabilizer increases, particularly at 40/60, X/MG, which was quite unexpected;
2. Efficacy of the methyl guar is dependent on the degree of substitution or extent of methylation.
3. Admixture of methyl guar and xanthan are more effective for preventing sedimentation than admixture of xanthan and guar; and either xanthan, or methyl guar, or hydroxypropyl guar or guar alone; particularly at a ratio of 40:60 xanthan to methyl guar and a degree of methyl substitution of 0.13.
4. As a single component methyl guar is more effective than guar or hydroxypropyl guar.

What is claimed is:

1. In a carbonaceous slurry containing a stabilizer in an amount sufficient to stabilize said slurry wherein said stabilizer is selected from the group consisting of:
   (a) an alkyl ether of a polygalactomannan
   (b) a mixture of said alkyl ether and xanthan gum
   (c) a mixture of an hydroxyalkyl ether of a polygalactomannan and xanthan gum
   (d) a mixture of said alkyl ether and said hydroxyalkyl ether and xanthan gum wherein said alkyl group contains from 1–20 carbon atoms; said polygalactomannan gum alkyl ether has a degree of substitution of 0.05 to 3 and said xanthan gum in mixture (b), (c) and (d) comprises up to about 85 weight percent of the total mixture of said ether and said xanthan gum.

2. A slurry as defined in claim 1 wherein said stabilizer is employed in an amount up to 2 weight percent based on the total weight of said slurry.

3. A slurry as defined in claim 2 wherein said stabilizer is employed in an amount less than 1 weight percent.

4. A slurry as defined in claim 2 wherein said stabilizer is employed in an amount of about 0.02 to 0.2% by weight.

5. A slurry as defined in claim 1 wherein said alkyl group contains from 1–4 carbon atoms.

6. A slurry as defined in claim 1 wherein said stabilizer is methyl guar.

7. A slurry as defined in claim 1 in which said degree of substitution is from about 0.1 to about 0.4.

8. A slurry as defined in claim 1 in which said degree of substitution is from about 0.13 to 0.31.

9. A slurry as defined in claim 1 in which the weight ratio of xanthan gum to polygalactomannan ether is from 20:80 to 80:20.

10. A slurry as defined in claim 1 in which the weight ratio of xanthan gum to polygalactomannan ether is from 60:40 to 40:60.

11. A slurry as defined in claim 1 in which said polygalactomannan ether is methyl guar.

12. A slurry as defined in claim 1 in which said hydroxyalkyl ether of a polygalactomannan is hydroxyethyl guar.

13. A slurry as defined in claim 1 in which said hydroxyalkyl ether of a polygalactomannan is hydroxypropyl guar.

14. A slurry as defined in claim 16 wherein said hydroxypropyl guar has a degree of molar substitution from about 0.01 to about 2.

15. A carbonaceous slurry comprising a carbonaceous solid, a liquid, and alkyl ether of a polygalactomannan gum in an amount sufficient to stabilize said slurry wherein said alkyl group contains from 1-20 carbon atoms and said alkyl ether has a degree of substitution of from 0.05 to 3.

16. A slurry as defined in claim 15 wherein said alkyl ether is the methyl ether of guar gum.

17. A slurry as defined in claim 15 wherein said alkyl ether is the methyl ether of locust bean gum.

18. A slurry as defined in claim 15 in which said carbonaceous solid is coal, said liquid is water and said alkyl ether is a methylether of guar gum having a degree of substitution of from about 0.13 to about 0.31.

19. A slurry as defined in claim 18 which further comprises a xanthan gum wherein said weight ratio of xanthan gum to methyl guar is about 60:40 to about 40:60.

20. A carbonaceous slurry stabilizer composition comprising a blend of xanthan gum and an alkyl ether of a polygalactomannan.

21. A stabilizer composition in accordance with claim 20 wherein the ratio of said xanthan gum to said gum ether ranges from about 80:20 to about 20:80 by weight of the xanthan gum/gum ether composition.

22. A stabilizer composition in accordance with claim 20 wherein the ether is a methyl guar.

23. A stabilizer composition as defined in claim 22 wherein said methyl guar has a degree of substitution of about 0.13 to about 0.31.

24. A carbonaceous slurry stabilizer composition comprising a blend of xanthan gum and an hydroxyalkyl ether of a polygalactomannan.

25. A slurry stabilizer composition as defined in claim 24 wherein the ratio of xanthan gum to said hydroxyalkyl ether ranges from about 80:20 to about 20:80 by weight of the xanthan gum/gum ether composition.

26. A stabilizer composition as defined in claim 24 wherein said hydroxyalkyl ether is hydroxyethyl guar.

27. A stabilizer composition as defined in claim 24 wherein said hydroxyalkyl ether is hydroxypropyl guar.

28. A stabilizer composition as defined in claim 33 wherein said hydroxypropyl guar has a degree of molar substitution ranging from about 0.01 to about 2.

29. A method of stabilizing a carbonaceous slurry as defined in claim 1 comprising first adding a nonionic surfactant to a carbonaceous slurry and then adding the stabilizer composition to the carbonaceous slurry.

30. A method of transporting a carbonaceous solid by pipeline comprising pumping the carbonaceous slurry of claim 1 through a pipeline.

* * * * *